(12) United States Patent
Mullan et al.

(10) Patent No.: US 10,754,328 B2
(45) Date of Patent: Aug. 25, 2020

(54) SELF-ADAPTIVE DEVICE INTELLIGENCE AS A SERVICE ENTERPRISE INFRASTRUCTURE FOR SENSOR-RICH ENVIRONMENTS

(71) Applicant: Accenture Global Services Limited, Dublin (IE)

(72) Inventors: Pramila Mullan, Los Gatos, CA (US); Michael Mui, San Francisco, CA (US); Anuraag Chintalapally, Boulder, CO (US); Cindy Au, Houston, TX (US)

(73) Assignee: Accenture Global Solutions Limited, Dublin (IE)

( * ) Notice: Subject to any disclaimer, the term of this patent is extended or adjusted under 35 U.S.C. 154(b) by 269 days.

(21) Appl. No.: 14/844,286

(22) Filed: Sep. 3, 2015

(65) Prior Publication Data

US 2016/0067864 A1 Mar. 10, 2016

Related U.S. Application Data

(60) Provisional application No. 62/046,885, filed on Sep. 5, 2014.

(51) Int. Cl.
| | |
|---|---|
| *G05B 19/418* | (2006.01) |
| *B25J 9/16* | (2006.01) |
| *G06F 8/60* | (2018.01) |

(52) U.S. Cl.
CPC ........ *G05B 19/4185* (2013.01); *B25J 9/1605* (2013.01); *G06F 8/60* (2013.01);
(Continued)

(58) Field of Classification Search
CPC .......................................... G05B 2219/32129
See application file for complete search history.

(56) References Cited

U.S. PATENT DOCUMENTS

| | | | | |
|---|---|---|---|---|
| 2007/0061041 A1* | 3/2007 | Zweig | ................... | G05D 1/0261 700/245 |
| 2007/0192910 A1* | 8/2007 | Vu | ........................... | B25J 5/007 700/245 |

(Continued)

OTHER PUBLICATIONS

Zufferey JC., Floreano D., van Leeuwen M., Merenda T. (2002) Evolving Vision-Based Flying Robots. In: Bülthoff H.H., Wallraven C., Lee SW., Poggio T.A. (eds) Biologically Motivated Computer Vision. BMCV 2002. Lecture Notes in Computer (Year: 2002).*

(Continued)

*Primary Examiner* — James J Lee
*Assistant Examiner* — Shon G Foley
(74) *Attorney, Agent, or Firm* — Brinks Gilson & Lione (57) ABSTRACT

A device intelligence architecture configures and controls on-site devices and performs environment monitoring to facilitate effective device functionality. The architecture facilitates efficient use of devices (e.g., robotics) in an unstructured and dynamic environment, which will allow deployments in many more environments than is currently possible. The architecture stores and shares information between segregated devices to avoid the silo effect of vendor specific stacks. The architecture also models capabilities of devices and maps actions to intelligence packages to deploy a specific intelligence package to the device. The architecture also implements distributed processing. For instance, computationally intensive tasks may be offloaded to the back end processing, with action updates resulting from the processing pushed to the devices.

20 Claims, 7 Drawing Sheets

(52) U.S. Cl.
CPC .............. *G05B 2219/31418* (2013.01); *G05B 2219/32129* (2013.01); *G05B 2219/34256* (2013.01); *G05B 2219/40518* (2013.01); *Y02P 90/18* (2015.11); *Y10S 901/28* (2013.01); *Y10S 901/47* (2013.01)

(56) References Cited

U.S. PATENT DOCUMENTS

| | | | |
|---|---|---|---|
| 2010/0272258 A1* | 10/2010 | Sadovsky | G06F 9/5027 380/255 |
| 2013/0290234 A1* | 10/2013 | Harris | G06N 5/022 706/46 |

OTHER PUBLICATIONS

Sturm, Jürgen et al., "A Probabilistic Framework for Learning Kinematic Models of Articulated Objects," Journal of Artificial Intelligence Research 41, 2011, pp. 477-526 website found at: https://www.jair.org/media/3229/live-3229-5801-jair.pdf.
"Package Summary," website as found at: http://wiki.ros.org/articulation_models, 10 pages, accessed Dec. 9, 2016.
"Getting started with Articulation Models," website as found at http://wiki.ros.org/articulation_tutorials/Tutorials/Getting%20started%20with%20Articulation%20Models, 8 pages, accessed Dec. 9, 2016.
"Package Summary," website as found at: http://wiki.ros.org/urdf, 8 pages, accessed Dec. 9, 2016.
"Package Summary," website as found at: http://wiki.ros.org/mod_srdl, 5 pages, accessed Dec. 9, 2016.

* cited by examiner

SELF-ADAPTIVE DEVICE INTELLIGENCE AS A SERVICE ENTERPRISE INFRASTRUCTURE FOR SENSOR-RICH ENVIRONMENTS

PRIORITY CLAIM

This application claims priority to provisional patent application No. 62/046,885, filed 5 Sep. 2014, which is entirely incorporated by reference.

TECHNICAL FIELD

This disclosure relates to a system architecture for configuration of on-site devices, such as robots, including optimization for monitoring and control of resources to facilitate enhanced functionality.

BACKGROUND

The configuration, monitoring, and control of resources deployed in the field is often a significant technical challenge. The immense number of possible target configurations and the resources they depend upon creates an enormous space to navigate in terms of optimized configuration, monitoring, and control. The ever increasing complexity of resources and newly emerging types of resources will continue to make resource configuration, monitoring, and control a difficult technical challenge to meet.

DETAILED DESCRIPTION

The architecture described below facilitates adaptive infrastructure with the capabilities to configure re-configure on-site devices, and monitor and control the devices to facilitate execution of actions with respect to pre-defined parameters. The architecture, for example, may receive feedback from a feedback loop including the sensing and controlling of sensors, machines (e.g. robots), autonomous systems, and other on-site devices through communications which may occur in many ways, e.g., through application programming interfaces (APIs). The architecture also provides distributed device intelligence, environment analysis, information sharing, and action sequences for deployed devices as a Device Intelligence as a Service (DIaaS) architecture. DIaaS includes Robotic Intelligence as a Service (RIaaS).

The DIaaS architecture configures and controls on-site devices and performs environment monitoring to facilitate effective device functionality. The architecture facilitates efficient use of devices (e.g., robotics) in an unstructured and dynamic environment, which will allow deployments of such devices in many more environments than is currently possible. The architecture stores and shares information between segregated devices to avoid the silo effect of vendor specific device stacks. The architecture also models capabilities of devices and maps actions to intelligence packages to select, configure, and deploy a specific intelligence package to the device. The architecture also implements distributed processing. For instance, computationally intensive tasks may be offloaded to a separate compute engine, with action updates resulting from the offloaded tasks pushed to the devices or driving system decisions on how to adapt device intelligence packages.

The architecture described below also facilitates standardization of protocols, development frameworks, and the use of standards in areas of connected devices, featuring e.g., modularity, shared libraries, and standardization in algorithms and intelligence stacks developed on adaptable frameworks. This architecture provides a new form of infrastructure for, e.g., industrial and enterprise environments that breaks devices out of silos and facilitates interoperability and data exchange between the devices. The architecture facilitates the implementation of adaptive infrastructure responsive to incoming data streams of observations from humans, robots, sensors, and other data sources, with the capability to physically interact with the environment via robots and actuators. The architecture also facilitates configuration updates to deployed devices, optimization of task execution for deployed devices, and dynamic action patterns for deployed devices.

Figure 1:
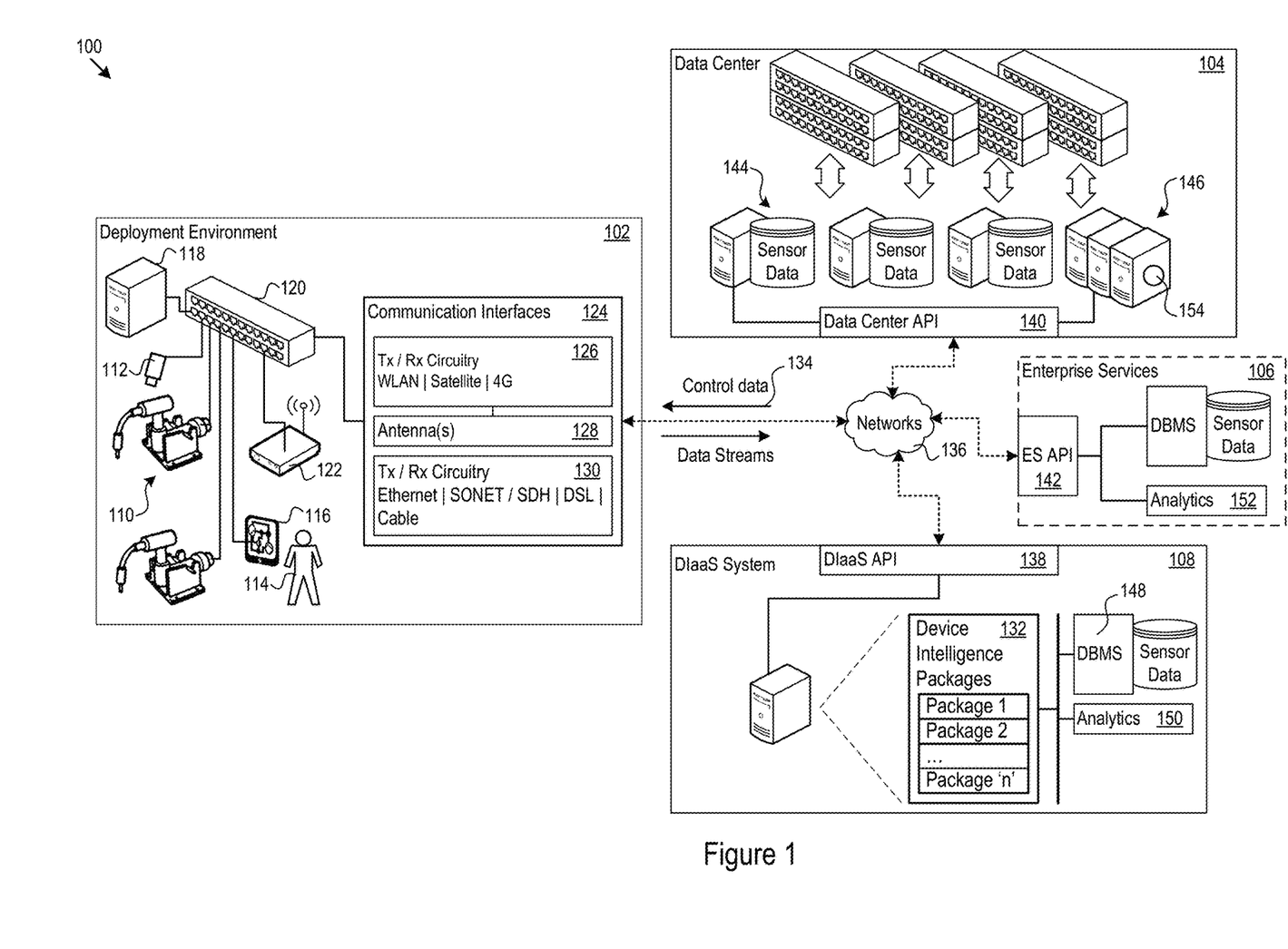
FIG. 1 shows an example system architecture.

FIG. 1 shows an example system architecture 100 ("architecture 100"). The architecture 100 includes a deployment environment 102, a data center 104, an enterprise services system 106, and a DIaaS system 108. The deployment environment 102 may be any location where devices are deployed. As one example, the deployment environment 102 may be a factory that includes an assembly line with robots 110, sensors 112, factory personnel 114, portable devices 116 such as tablet computers and measurement devices, computer systems 118, machinery (e.g., welders, assembly lines, and cranes), networking devices such as the switch 120 and router 122, and other entities. The sensors 112 may include video cameras, microphones, temperature sensors, vibration sensors, position sensors, stress sensors, and other types of sensors. The sensors may be incorporated into the devices or separate from the devices. Accordingly, additional examples of sensors include angular sensors and displacement sensors for rotational and prismatic robot joints.

The devices generate data streams characterizing the deployment environment 102. As just a few examples the data may include: locations and orientations of objects and people, temperatures, operational status of the devices, device configuration (e.g. hardware and software versions), current task status, joint parameters, current camera video and audio. The communication interfaces 124 transmit and receive data, for instance to send the data streams to other systems in the architecture 100, and receive device intelligence packages, policy updates, and other control data from the other systems in the architecture 100.

The communication interfaces 124 may include wireless transmitters and receivers ("transceivers") 126 and antennas 128 used by the transceivers 126. The transceivers 126 and antennas 128 may support WiFi network communications, for instance, under any version of IEEE 802.11, e.g., 802.11a/b/g/n or 802.11ac. The communication interfaces 124 may also include physical medium transceivers 130.

The transceivers 130 may provide physical layer interfaces for any of a wide range of communication protocols, such as any type of Ethernet, data over cable service interface specification (DOCSIS), digital subscriber line (DSL), Synchronous Optical Network (SONET), or other protocol.

The observations and measurements in the data streams are communicated to the other systems, including to the DIaaS system 108. The DIaaS system 108 may select, modify, update, adapt, execute, or otherwise implement device intelligence packages 132 for any of the devices in the deployment environment 102. The DIaaS system 108 may make intelligence package decisions based on any of the data obtained from the deployment environment 102. As examples, the DIaaS system returns all or part of selected device intelligence packages, updated policy metadata for executing the packages, or other device parameters as control data 134 to the devices. The communication between the systems in the architecture 100 may occur over any type of public and private network or networks 136. Further, the communication between the systems may occur through application programming interfaces (APIs) exposed by any of the systems, such as the DIaaS API 138, the Data Center API 138, and the Enterprise API 140. In that regard, the APIs 138, 140, and 142 may provide specific API functions that systems invoke to send and receive data streams, including device intelligence packages or any other type of control data 134.

The DIaaS system 108 may be implemented as a separate analysis entity, and may be located in any desired location. In other implementations, the DIaaS system 108 is included with other systems. That is, DIaaS system 108 may be a separate service provided to any customer by an independent entity that implements the DIaaS system 108. For instance, the DIaaS system 108 may be hosted at a separate data center (e.g., the data center 104) dedicated to managing intelligence packages in a virtualized setting for any number of connected devices and deployment environments.

In the example shown in FIG. 1, the data center 104 provides high volume data storage 144 and a high performance compute engine 146. The high volume data storage 144 may provide storage for data streams from the deployment environment. As described in more detail below, the high performance compute engine 146 may analyze the data streams to offload computationally intensive operations and help decisions about device control and configuration, e.g., as an aid to the sometimes limited processing power in the local devices.

Any of the deployment environment data obtained from the deployment environment 102 may also be communicated to the enterprise services system 106 and DIaaS system 108. The DIaaS system 108 and enterprise services system 106 may also provide high volume storage (e.g., via a database management system 148 (DBMS)) and analytics engines 150, e.g., via a service oriented architecture. In that regard, the DIaaS system 108 and enterprise services system 106 may implement structured or unstructured data storage for the deployment environment data, and act as a data aggregation point for the volumes of deployment environment data received in the data streams over time. Cloud based storage is only one option, however, and a wide variety of data storage systems implemented in other manners may hold the deployment environment data.

The analytics engines 150, 152, 154 may analyze the deployment environment data, refine and analyze models representing the deployment environment, the devices, and the intelligence packages. The analytics engines 150-154 may generate, e.g., as control data 134, better optimized policies for the deployment environment, including for any specific device, or for the analytics engines 150-154 as a whole. There may thus be a feedback loop from the deployment environment 102, through the networks 136 and APIs 138, 140, 142 to the connected systems, and from the connected systems back to the deployment environment, e.g., back to any particular device, set of devices, or to the deployment environment as a whole (e.g., feedback concerning overall operation of a manufacturing plant).

Figure 2:
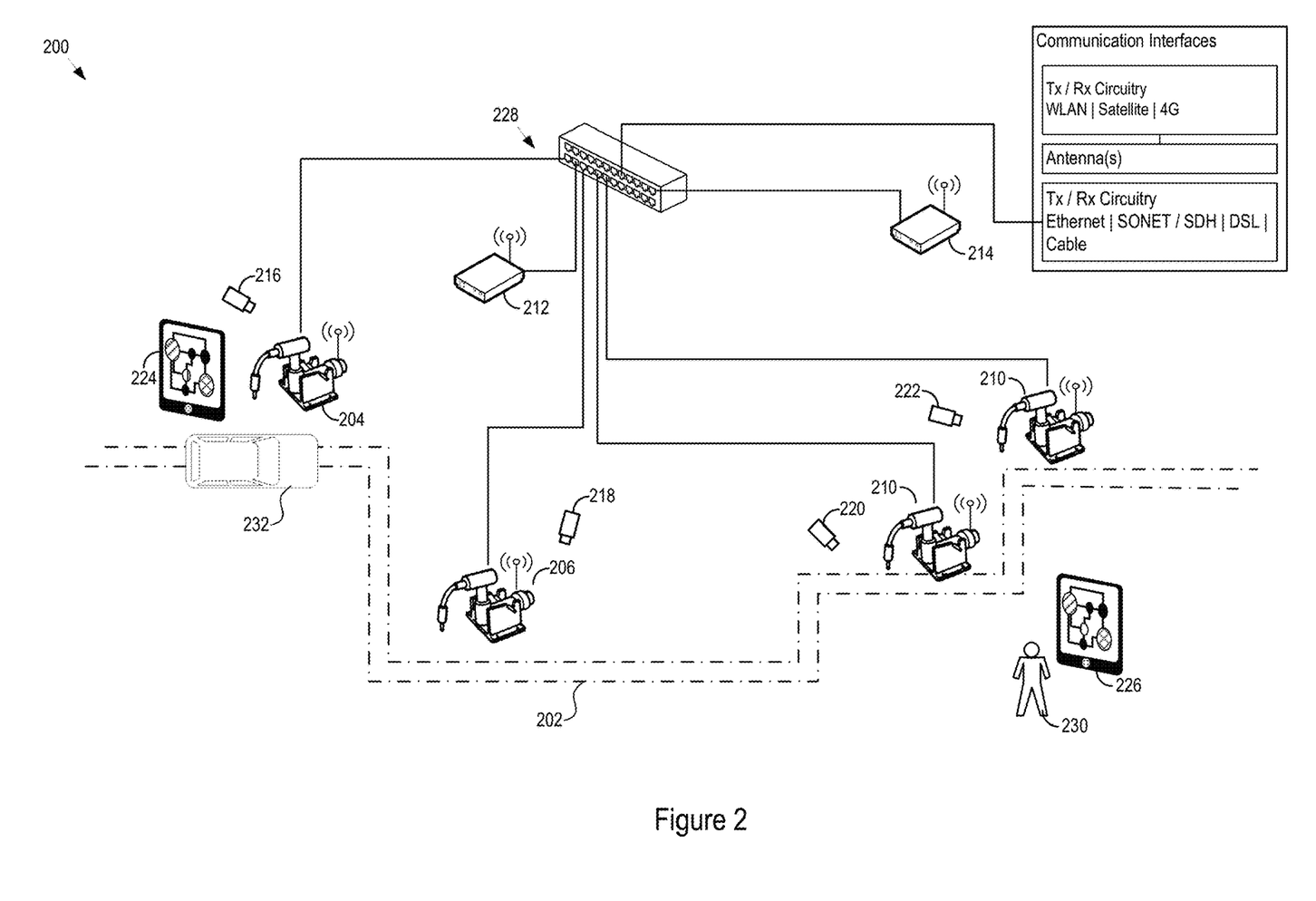
FIG. 2 shows an example deployment environment.

FIG. 2 shows an example of a deployment environment 200 for the purposes of further discussion below. The deployment environment 200 may be any industrial environment, such as a manufacturing assembly line, industrial materials processing plant, or factory inventory area. In particular, the deployment environment 200 shown in FIG. 2 is an industrial environment that includes the assembly line 202. A deployment environment is not limited to industrial settings, however, and any environment in which devices execute functions is a possibility, such as a vehicle environment, a hospital environment, or a classroom environment.

A deployment environment may include any number of devices. The example deployment environment 200 in FIG. 2 includes four robots 204, 206, 208, and 210, WiFi access points 212 and 214, and environmental sensors 216, 218, 220, and 222. Additional, fewer, or different devices and sensors may be present in the deployment environment 200, including as examples. Examples of additional devices include hubs, switches, routers, bridges, data servers, actuators, generators, motors, machinery, monitoring devices, computers, management or control systems, environment management devices, analysis systems, communication devices, and mobile devices such as the tablet devices 224 and 226. The robots 204, 206, 208, and 210 communicate over a network 228, through which the robots 204, 206, 208, and 210 receive control data, e.g., the control data 134 from external systems and access the external systems to, e.g., obtain device intelligence package, access environment maps, obtain policy metadata, and otherwise interact externally to the deployment location 200.

The sensors 216-222 may monitor locations in the deployment environment 200. In FIG. 2, the sensors 216-222 are positioned at predetermined monitoring locations along the assembly line 202 and proximate to the robots 204-210. The sensors 216-222 capture environment data, such as visual data, audio data, temperature data, positional or movement data, or any other environment data indicative of a characteristic of the deployment environment 200. The sensors 216-222 may communicate data streams to any device in the deployment environment 200 or external to the deployment environment 200 through the communications interfaces 124, e.g. to the DIaaS system 108.

The devices in the deployment environment 200 include communication interfaces that support communications with other devices within or outside of the deployment environment 200. A communication interface may be configured to communicate according to any predetermined communication techniques, standards, protocols, or across various networks or topologies. For example, a communication interface may communicate according to any of the following network technologies, topologies, mediums, protocols, or standards: Ethernet including Industrial Ethernet, any open or proprietary industrial communication protocols, cable (e.g. DOCSIS), DSL, Multimedia over Coax Alliance (MoCA), power line (e.g. HomePlug AV), Ethernet Passive Optical Network (EPON), Gigabit Passive Optical Network (GPON), any number of cellular standards (e.g., 2G, 3G, Universal Mobile Telecommunications System (UMTS), GSM® Association, Long Term Evolution (LTE)™, or more), WiFi (including 802.11 a/b/g/n/ac), WiMAX, Bluetooth, WiGig (e.g., 802.11ad), and any other wired or wireless technology or protocol.

The devices in the deployment environment 200 capture environmental characteristics in the deployment environment 200, including the characteristics of the devices themselves. For instance, the robot 204 may include multiple actuators that control the physical movement of the robot 204, including arms, joints, and end effectors through which the robot 204 interacts with its surrounding environment. The robot 204 may, as one specific example, include a sonar sensor that captures sonar data of the environment around the robot 204. The sonar sensor data may detect the presence of entities in the deployment environment 200, including material objects as well as human operators 230.

The robots may be modelled as a multi-body system, with linkages connected by joints that the robot 204 manipulates using actuators. The robot arms, joints, and end effectors may also be provided with feedback sensors, which may be used to facilitate more dynamic interactions with the objects in the deployment environment 200. Examples of feedback sensors include cameras on the arms, which may allow for vision guided control of the arms 143 and force, proximity, or pressure sensors on the arms and end effector that may provide location and force feedback data. The robots physically manipulate objects in the deployment environment 200 to carry out a particular task. The task may be defined as a "recipe" with multiple steps for the robot 204 to execute, and any of the steps, or the task as a whole, may be executed or controlled with a particular device intelligence package for the robot 204.

As an example, the robot 204 may be a welder for frame parts of an automobile frame 232 on the assembly line 202. The robot 204 may be contextually aware using, e.g., camera sensors on its arms, and capture the current state of the deployment environment 200. For instance, the robot 204 may capture state information for the robot 204 itself (e.g., position of each arm, joint, and end effector, operating status, and other information), and may also capture state information for the deployment location sensed by the robot 204 (e.g., position of the automobile frame 232).

Device intelligence packages (described further below) provide the robot 204 (and other devices in the deployment environment 200) with control inputs for, e.g., calculating the next motion to make for welding. Welding may be one of many different interactions that are taking place in the deployment environment 200, and there may be any number of human operators 230, devices, and sensors interacting with any number of physical objects in the deployment environment. The interactions often need to occur in a coordinated fashion. For instance, along the assembly line 202, there may be multiple robots 204 that may perform distinct operations in a coordinated fashion. As just a few examples, the robot 204 may weld, the robot 206 may inspect the welds, the robot 210 may add doors to hinges on the automobile frame 232, and the robot 210 may insert the engine into the engine compartment. The human operators 230 may move through the deployment environment 200, capture state information using, e.g., the tablet device 226, and transmit the state information to the system 300 for analysis via any available communication interface.

Figure 3:
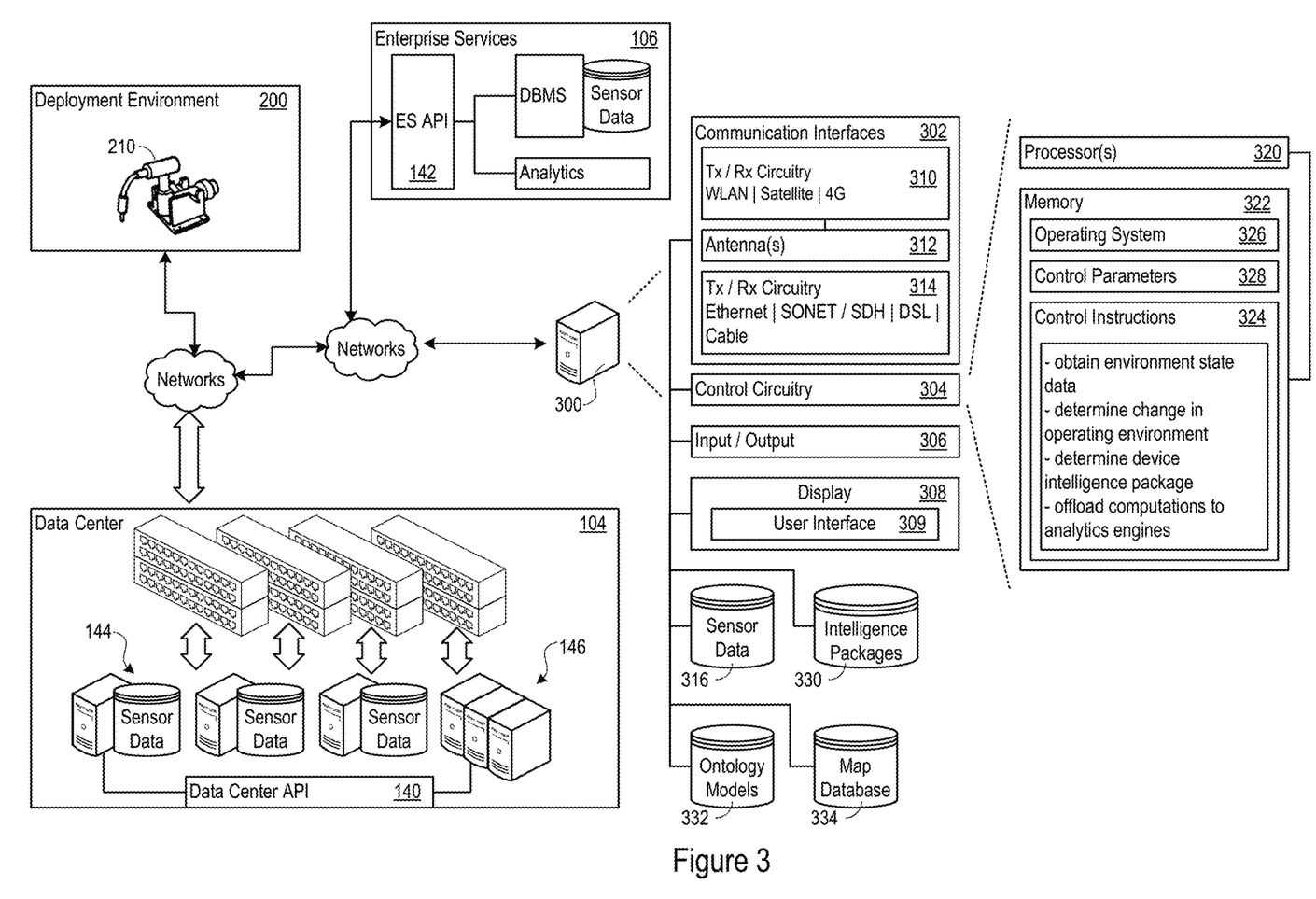
FIG. 3 shows an example of a system implementation for device intelligence as a service.

FIG. 3 shows an example of a DIaaS system 300. The system 300 includes communication interfaces 302, control circuitry 304, input/output interfaces 306, and a display 308 on which the system 300 generates a user interface 309. The communication interfaces 302 may include wireless transmitters and receivers ("transceivers") 310 and any antennas 312 used by the transceivers 310. The physical layer transceivers 314 may provide physical layer interfaces for any of a wide range of communication protocols, such as any type of Ethernet, data over cable service interface specification (DOCSIS), digital subscriber line (DSL), multimedia over coax alliance (MoCA), or other protocol. The system 300 also includes storage devices, such as hard disk drives (HDDs) and solid state disk drives (SDDs).

The system 300 may define and maintain databases that support the operation of the system 300. Examples of the databases include a data stream database 316 that stores data received from the deployment environment 200, including sensor data, environment state data, and or other types of data; and an intelligence packages database 330 that may define a library of available device intelligence packages. The system 300 may also store and analyze device ontology models in an ontology model database 332. As described further below, the ontology models may define a description of any device in the deployment environment, including the device components, capabilities, and task models.

As yet another example, the system 300 may define and maintain a map database 334. The map database 334 may store a representation of the state of any deployment environment. The state information may include any pre-selected set of characteristics of the deployment environment, including, as examples, the position and orientation of devices, objects, and personnel in the deployment environment, the temperature, vibration level, and stress level of entities in the deployment environment, and the status of devices in the deployment environment. The system 300 may update the map database 334 with any chosen frequency to, e.g., maintain a current snapshot of the state of any given deployment environment for later analysis with respect to device control.

The control circuitry 304 may include any combination of hardware, software, firmware, or other logic. The control circuitry 304 may be implemented, for example, with one or more systems on a chip (SoC), application specific integrated circuits (ASIC), discrete analog and digital circuits, and other circuitry. The control circuitry 304 is part of the implementation of any desired functionality in the system 300. In that regard, the control circuitry 304 may, as just a few examples, analyze state information obtained from the deployment environment 200 to determine applicable intelligence packages, determine updated execution parameters for the intelligence packages, and perform computationally intensive analytics (e.g., machine learning processes) for the devices in the deployment environment 200.

As just one example, the control circuitry 304 may include one or more processors 320 and memories 322. The memory 322 stores, for example, control instructions 324 and an operating system 326. The processor 320 executes the control instructions 324 and the operating system 326 to carry out any desired functionality for the system 300, as examples: obtaining environment state data (e.g., current device state); determining changes in operating environment; determining which device intelligence package will control a selected device; and offloading selected computations to high speed analytics engines. The control parameters 328 provide and specify configuration and operating options for the control instructions 324, operating system 326, and other functionality of the system 300.

Several operational examples are described further below. As an initial example, described in conjunction with the logical flow in FIG. 4, the communication interfaces 302 establish a data connection between the deployment environment 200 and the system 300 (402). The system 300 stores, e.g., in the memory 322, a data stream received through the communication interface (404). The data stream includes environmental characteristics of the deployment environment 200.

Figure 4:
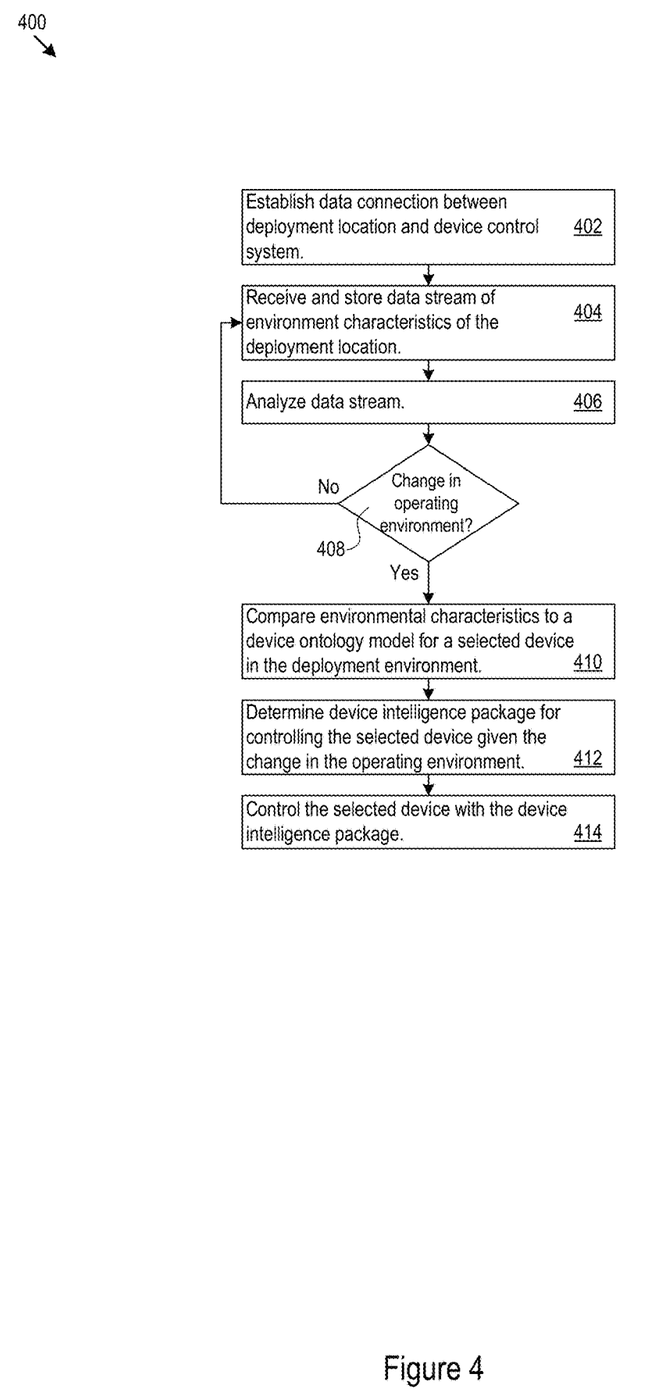
FIG. 4 shows one example of logic that a device intelligence as a service (DIaaS) system may implement.

Environmental characteristics may vary widely. As one example, the environmental characteristics include state information for any specific device in the deployment environment 200. In the context of a robot on a manufacturing line, example environmental characteristics include the position of the robot joints, the speed of the robot or any part of the robot, the location of the robot or any part of the robot, the audio, video, temperature, vibration, stress, temperature, or any other environmental feature sensed by the robot in the deployment environment 200.

The system 300 locally stores or has access to a device intelligence package library, e.g., in the device intelligence package database 330. The device intelligence package library stores device intelligence packages configured to govern operational characteristics of selected devices at the deployment environment 200. Within the system 300, the control circuitry 304 analyzes the data stream (406) to determine whether there is any change in the operating environment at the deployment location responsive to the data stream (408).

The change in operating environment may drive changes to the device intelligence package used to control a selected device in the deployment environment 200. In one implementation, the system 300 compares the environmental characteristics to a device ontology model for the selected device (410) and responsively identifies a specific device intelligence package for controlling the selected device given the change in the operating environment (412).

The system 300 controls the selected device with the chosen device intelligence package (414). In that regard, the system 300 may communicate to the selected device, through the communication interface 302, control data determined by or including the device intelligence package. The system 300 may, for instance, execute the device intelligence package locally in the system 300 as a proxy for the selected device. In other implementations, the system 300 may deliver at least a portion of the intelligence package to the selected device for execution by the selected device itself.

The device intelligence packages may vary widely. As one example, a device intelligence package may implement a robot motion planning package, and the robot motion control package may include a series of actions for the selected device to execute to complete a robot motion task. Other examples of device intelligence packages include heating, cooling, and other environmental control packages; manufacturing line controls, such as control packages for performing welding, machining, part inspection, and process control tasks; and communication packages for distributing environmental characteristics received from a given device to other devices in the deployment environment.

Figure 5:
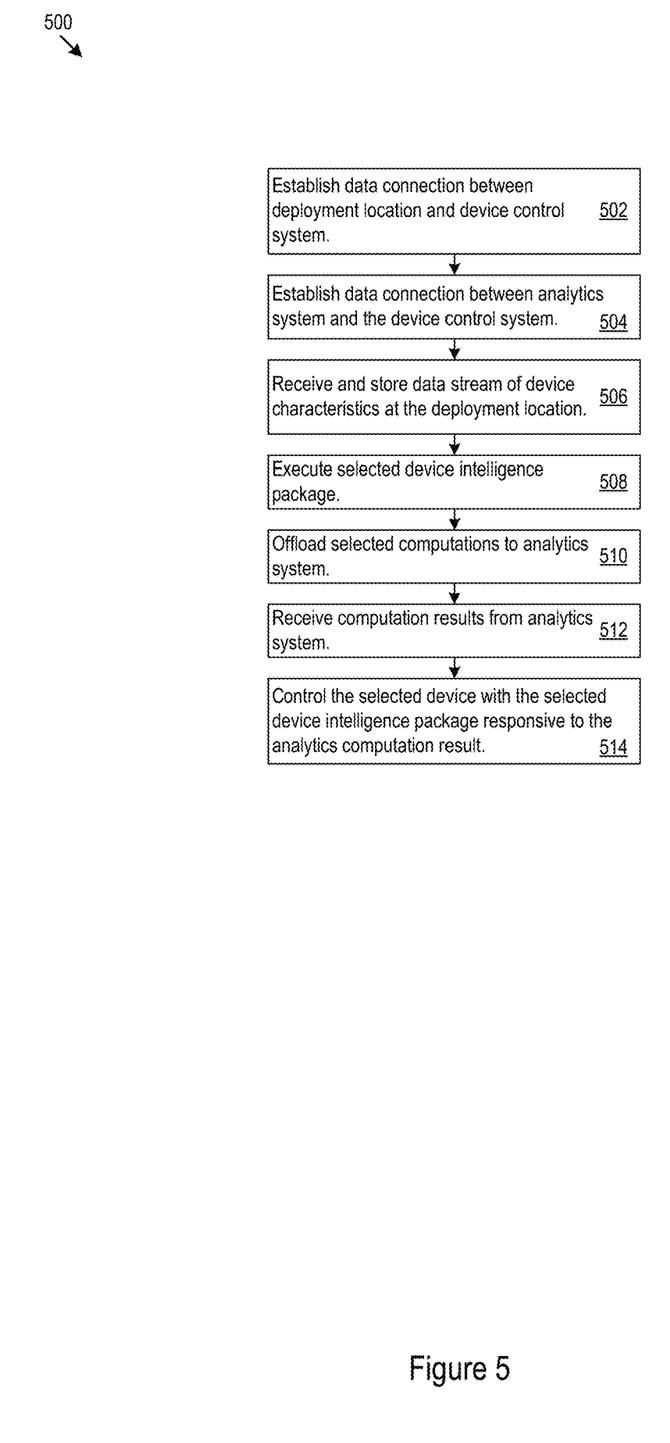
FIG. 5 shows another example of logic that a DIaaS system may implement.

Another operational example is described in conjunction with the logical flow in FIG. 5. In this example, the system 300 establishes a data connection between a deployment environment 200 and the system 300 (502), and between an analytics system and the system 300 (504). The system receives and stores in memory the device characteristics of a selected device at the deployment location received through the communication interface (506).

The control circuitry 304 in the system 300 has access to a device intelligence package library 330 storing a device intelligence package that determines operational characteristics of the selected device at the deployment environment 200. The control circuitry 304 executes a selected device intelligence package, available in the device intelligence package library, for determining the operational characteristics (508). The control circuitry 304 also offloads selected computations of the selected device intelligence package to the analytics system (510). In that regard, the control circuitry 304 may turn to high performance computing engines to execute complex analytics tasks, such as motion optimization or machine learning tasks that provide input back to the selected device intelligence package.

The control circuitry 304 receives the computation results for the selected computation from the analytics system (512). The computation results provide input to selected device intelligence package for controlling the selected device. Accordingly, the control circuitry 304 controls the selected device with the selected device intelligence package responsive to the analytics computation result (514).

Figure 6:
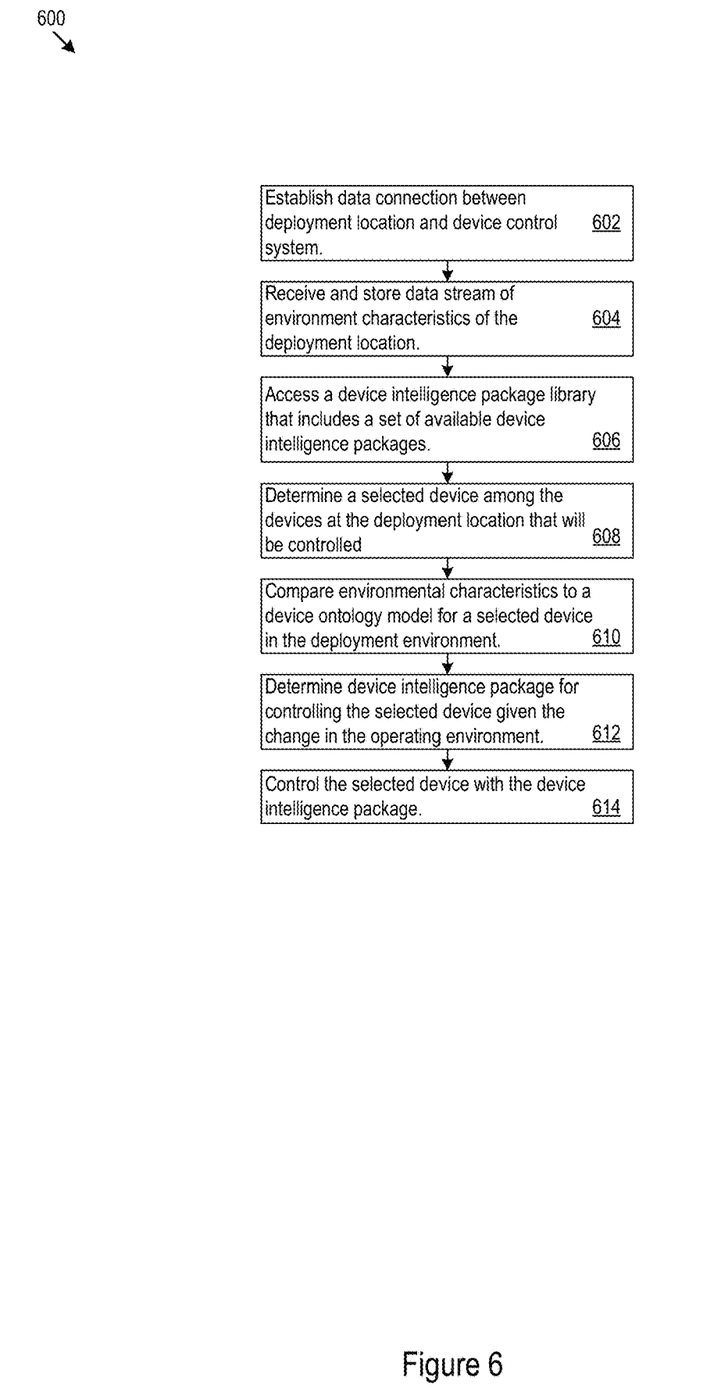
FIG. 6 shows another example of logic that a DIaaS system may implement.

Another operational example is described in conjunction with the logical flow in FIG. 6. In this example, the system 300 determines which device intelligence package to execute for a given device in the deployment environment 200. The system 300 establishes a data connection between a deployment environment 200 and the system 300 (602). The system receives and stores in memory environment characteristics (e.g., characteristics of a selected device) of the deployment location received through the communication interface (604).

The control circuitry 304 accesses a device intelligence package library that includes a set of available device intelligence packages (606). Each of the device intelligence packages is configured in its own way to govern operational characteristics of specific devices at the deployment environment 200. The control circuitry determines a selected device among the specific devices that will be controlled (608). The control circuitry 304 compares the environmental characteristics to a device ontology model for the selected device (610) and responsively identifies a selected device intelligence package, in the device intelligence package library, with which to control the selected device (612). Having selected the device intelligence package, the control circuitry 304 controls the selected device with the selected device intelligence package (614).

The system 300 provides a more flexible controller infrastructure that supports the agility needed in the increasingly dynamic industrial settings. The system 300 supports the software-defined machine (SDM) paradigm that focuses on decoupling the physical hardware from the software in order to abstract the applications and complex intelligence from the machine (e.g., a robot). The system 300 thereby facilitates software design paradigms in the enterprise environment to be more hardware-agnostic (e.g., robotic platform-agnostic), providing the infrastructure with the flexibility to manage, update and control the physical resources on site.

As one example, the system 300 facilitates software-defined robots with selected intelligence (e.g., motion-planning and task execution) executing local applications while providing a complete point of presence for the robots to feed back environmental data and receive operational guidance from the system 300. At the same time, the robots may have the majority of their intelligence and controller logic coming from a cloud-based, high performance computing intelligence stack, e.g., located in the back end within the system 300 in the device intelligence packages. The device intelligence packages help remove the constraints on the computational capabilities of the robot's on-board intelligence and facilitate more efficient robot (or more generally, device level) processing and deployment of the selected control, intelligence or learning stack for applications to run at the point device deployment.

The system 300 facilitates standardization of device development frameworks (e.g., the Robot Operating System (ROS), and distributed node systems). The system 300 also facilitates a new technical model referred to as DIaaS (Device Intelligence as a Service), which includes robot devices specifically, or RIaaS. In particular, in the system 300, device intelligence packages are developed not only by specific robotic manufacturers, but also by a whole ecosystem of independent developers, small start-ups, and software companies with expertise in this area on a common or standardized framework (or one of several frameworks with programming wrappers that provide a common interface format). In the system 300, the device intelligence packages developed in this ecosystem may be stored in the cloud and may be subscribed to by cross-robotic platforms. The different platforms may perform different tasks in different locations with interaction, control, and coordination performed by the system 300. The device intelligence package library provides one mechanism for developers to instantiate intelligence slices for devices, and expose the slices as a service to robotic platforms (e.g., multiple assembly lines owned by a manufacturer) subscribed to the system 300.

The system 300 may communicate, e.g., a set of action or planning policies for any device in the deployment environment 200 as part of the control data 134. In more detail, the communication may include packaged data supporting the device intelligence package that governs the operation of the device. The system 300 pushes the package data, e.g., metadata reflecting the state, context, or any observational data for the devices in the deployment environment. The system 300 (or other connected systems) may also locally compute policy (e.g., operational instructions or operating parameters), or offload computation tasks to help determine policy to high speed analytics engines, and pushes the policy back to the device.

The system 300 supports self-adaptive capabilities for the deployment environment 200. For instance, as different types of intelligence packages are selected for different types of devices and device tasks, the system 300 may track which packages are most suited for a particular task and deploy or implement those device intelligence packages for other devices in the deployment environment, and for other devices in other deployment environments with matching characteristics (e.g., two sets of robots on two different assembly lines, both sets of robots welding automotive parts). In that regard, the system 300 may determine, as examples, which device intelligence packages have higher success rates, or are more robust or fault tolerant, or are otherwise suitable for any particular environment, based on the environmental feedback obtained from the deployment environment 200. In that sense, the system 300 may implement self-adaptive infrastructure through auto-configuration of any of the devices in the deployment environment 200 (or environments with similar characteristics) by device intelligence package selection and parameter tuning based on past results as measured and analyzed over time.

The device intelligence packages may be implemented in many different ways. As one example, a device intelligence package may be a set of program instructions executed by the system 300 or by the device in the deployment environment. As another example, a device intelligence package may be a set of parameters specifying the operation of a device (e.g., speed, communication protocol, or tool type to use on the assembly line). Device intelligence packages may define one or more set of instructions to execute on one or more systems, e.g., welding control instructions for the robot 204 to execute while performing welding, welding supervision instructions for the system 300 to execute while performing image analysis to verify welds, and motion optimization instructions for the data center 104 to execute with the compute engine 146 to perform computationally intensive calculations in an attempt to optimize the motion of the robot 204 with regard to time, energy consumption, safety, or other parameters.

Expressed another way different portions of a device intelligence package may be implemented by different entities. For instance, the robot 204 may execute a portion of a device intelligence package that controls the weld temperature and welding tool activation duration, while the system 300 may execute a portion of the device intelligence package that controls the motion of the robot 204, including aspects such as collision avoidance, and motion path optimization to reduce time spent, energy spent, or other characteristics of the motion path for the robot 204. Further, a portion of device intelligence package may be configured for execution by a third system, e.g., offloaded to a separate computation engine. The third system may, for instance, execute complex machine learning algorithms to determine how to form the strongest welds in view of the environmental characteristics (e.g., current temperature and vibration levels) of the deployment environment 200.

For robots in particular, the device intelligence packages may implement forward kinematics algorithms to determine end effector position given joint parameters, and implement inverse kinematics algorithms to determine joint parameters that achieve any desired position on the end effector. The packages may further include motion planning algorithms for specifying the implementation of the joint parameters (e.g., sequence of joint motion, execution speed, and the like) to cause the motion that results in placing the end effector at the desired position.

Note also that the device intelligence packages may take into consideration the kinematic equations of external objects with which the devices are interacting. In the case of an unknown object in the deployment environment 200, the system 300 may perform pose estimation and process observations of pose change as the devices in the deployment environment 200 interact with the object to build a model of the object. The system 300 may then store the object model, and transmit it to other device in the deployment environment 200 for reuse. In addition or alternatively, the system 300 may obtain object scanning data to obtain specific dimensions of the object. To the model that includes the object scanning data, the system 300 may add, e.g., manually input data on linkages, materials, friction coefficients, and other characteristics. The system 300 may take this approach in, e.g., highly structured environments such as manufacturing, warehouses, other industrial environments. The system 300 may take the autonomous approach when working with devices in relatively unstructured environments, such as with patrolling robots, when monitoring robot encounters with unknown objects, or in other situations where environment cannot be fully accounted for beforehand.

The device intelligence packages may implement model estimation frameworks, e.g., as part of a ROS. The model estimation frameworks may include probabilistic frameworks or inverse reinforcement learning techniques that allow devices to learn the kinematic parameters/models of articulated objects by observing their motion via interactions. More specifically, a robot may interact with the object in an unstructured environment, observe how the various joints of the object can freely move (e.g., take pose observations), and the device intelligence package may use, e.g., maximum-likelihood sample consensus on a set of sample posterior observations to estimate the parameters for the models of rigid, prismatic joints, revolute joints and other model components. The device intelligence package may then select a specific model class for the links of an object, e.g., using Bayesian information criterion (BIC), and generate a kinematic graph that models the connectivity between object parts. In other words, the learned model assigns likelihoods to observed trajectories and predicts the configuration of the articulated object.

Describes another way, a robot with sensing capabilities encounters a previously unknown, unvisited object and needs to interact with it. The robot interacts with the object, (e.g., the robot pulls handles, slides doors, turns controls) and generates pose observations and measured trajectories of motions concerning the links and joints of the object. The device intelligence package may analyze the pose observations through a model estimation process, generate a reference trajectory, and estimate the model with parameter values.

After an articulation model for the object is obtained, the device intelligence package may attach the model to an object description and upload the model and description, e.g., to cloud storage. When another robot encounters the same object, the system 300 may then download the object description and model and send them to the robot. Alternatively, the robot itself may download object descriptions and models. The device intelligence package for the robot may then use the kinematic models to create an open-loop reference trajectory to interact with the object. Without prior model knowledge, the objects are difficult to manipulate before re-learning the model by observation, which is time, computation, and energy expensive. By sharing the learned articulation models of objects in the environment, the system 300 bypasses much of the learning redundancies and facilitates information sharing among the devices in the deployment environment 200.

As noted above, the device intelligence packages may implement tasks for the devices to execute. The task may be defined as a set of actions to be carried out. An action may invoke a specific discrete step (e.g., rotate a joint 10 degrees), or may be a complex action (e.g., weld the top frame to the bottom frame at seven different locations). The tasks may also define dependencies between actions which determine the order in which to carry out these actions. The tasks may further define information needed to carry out these actions, including but not limited to articulation models of objects the system expects the robot to encounter during the execution of the task, computational/intelligence packages required to perform a particular action in the recipe (e.g., object recognition through a pre-trained neural net model), and an environment map, which may be global or local depending on the task.

That is, given a particular situation, a robot can execute a set of tasks which constitute an action recipe. In the welding scenario, for instance, an action recipe may include the following steps: identifying the joint location, moving to the joint location, imaging the joint location, applying the welder to the joint location, verifying the weld, and sending environmental characteristics for each action to the system 300. Each step may be interpreted and executed by the robot 204. The interpretation may include loading a device intelligence package onto the robot 204 for facilitating execution of the task (e.g., executing a neural network model to verify a well-formed weld). In some implementations, the device intelligence packages provide instructions specifically directed to support infrastructure for the robots in the deployment environment. As one example, the device intelligence packages provide instructions to robot action servers or joint controllers which reside at the edge of the deployment environment 200 and outside of the system 300. The instructions may specify detailed low-level movement instructions for the robot.

The system 300, devices, and device intelligence packages may support the ROS, as noted above. ROS provides a framework for the system 300 that provides flexible definitions of individual actions. The framework is a modular, highly extensible publish/subscribe system that flexibly allows inter-communication between component nodes so that programmers can insert new components, subscribe to new data streams published by another component, or publish new information subscribed by others. Actions may be paired with a description or manifest that lists out required capabilities in the form of ROS Universal Robotic Description Format (URDF) or a Semantic Robot Description Language (SRDL) that describes the task model (e.g., required capabilities) of an action.

The system 300 may store and analyze device ontology models for any of the devices in the deployment environment 200. A device ontology model may be expressed in, for instance, SRDL to define a description of the device or otherwise describe and represent device components (e.g., specific hardware and software), capabilities (e.g., the ability to perform a certain action, the number of degrees of freedom, and computational capabilities), and task models. That is, information on different components is semantically annotated and described in a formalized notation that allows the components to be linked to an ontology that describes the device. This allows a device to logically infer relationships between components, capabilities and tasks, which become useful when the robot will verify that all capabilities for a task are available on the robot or to search for objects of a certain type in the current environment.

The system 300 may search through the ontology models of available devices in a deployment environment to find a device intelligence package most suited for the current state of the deployment environment. That is, the system may search the ontology models against a description of the task to be performed given, e.g., the current environmental characteristics of the deployment environment. The availability of a particular capability on a device, or lack thereof, may then serve as one of the constraints to a system-wide constrained optimization algorithm. Information (e.g., the state/environmental information and intelligence packages needed for actions) may be pushed to a knowledge base accessible by multiple devices and deployment environments. The system 300 may assigns tasks to capable robots, and the robot may pull knowledge from the knowledge base when performing the task.

Figure 7:
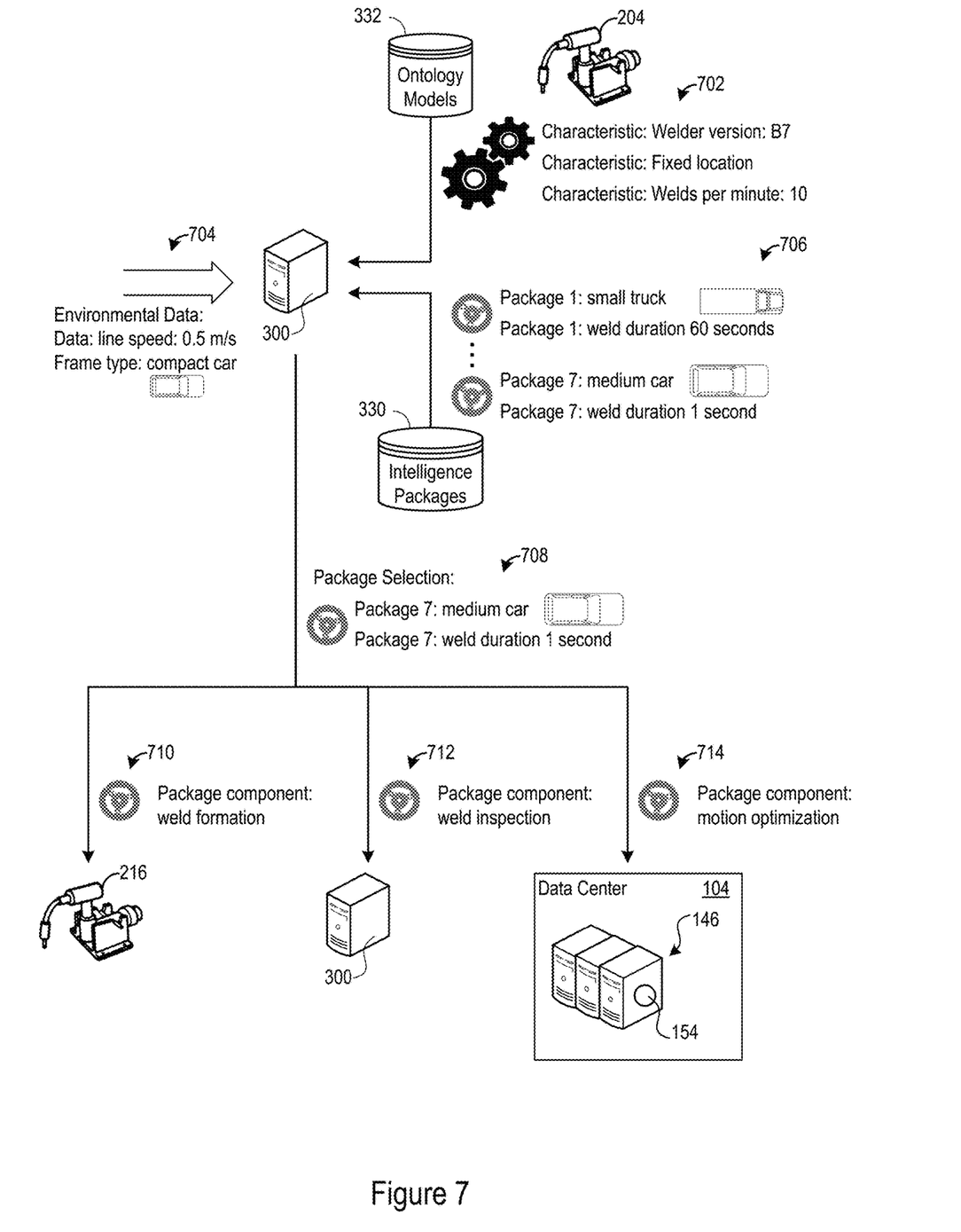
FIG. 7 shows an example of comparing state information against device ontology models to select a device intelligence package.

FIG. 7 shows an example of the system 300 searching through the ontology models of available devices in a deployment environment to find a device intelligence package most suited for the current state of the deployment environment. Continuing the example of the robot 204 performing welding on the automobile frame 232, the ontology models include an ontology model 702 for the robot 204. As just a few examples, the ontology model 702 establishes that the welder software version running in the robot 204 is "B7", that the robot 204 is in a fixed location and cannot move, e.g., along the assembly line 202, and that the robot 204 is capable of performing up to 10 welds per minute.

The system 300 receives a data stream of environmental characteristics of the deployment location 200. In the example in FIG. 7, the characteristics include that the assembly line speed is 0.5 m/s. The characteristics further include that assembly line sensors have detected that compact car frames are queued up on the assembly line 202 for welding.

The system 300 has access to the intelligence packages database 330. In this example, multiple device intelligence packages are defined in the intelligence packages database 330, including welding device intelligence packages 706. The welding device intelligence packages 706 are adapted to specific types of welding in specific environments, e.g., some are better suited to trucks or to cars, and to trucks and cars of different sizes. Further, some are adapted to different welding speeds, some faster and some slower.

In the example of FIG. 7, the system 300 compares the environmental characteristics 704 to the ontology model 702, and to the welding device intelligence packages 706. The system 300 chooses the welding device intelligence package 708 as the one best adapted to controlling the robot 204 perform welding on compact car frames at an assembly line speed of 0.5 m/s. Responsive to the selection, the system 300 deploys the welding intelligence package 708 for controlling the robot 204. In this example, the welding intelligence package 708 defines multiple package components. Specifically, the system 300: 1) delivers a weld formation package component 710 to the robot 204 itself for locally execution by the robot 204 to perform welds; 2) locally executes a weld inspection package component 712 for the benefit of the robot 204 that responds, e.g., to image data and temperature data obtained by the robot 204; and 3) delivers a motion optimization package component 714 to the data center 104 for execution on the compute engine 146 to offload computationally intensive motion optimization planning for the robot 204.

In some implementations, the intelligence packages include multiple categories of data, e.g., system level intelligence and edge level intelligence. System level intelligence packages may contain orchestration algorithms (e.g., a scheduler), which will determine how resources are allocated by the system. The system level packages may take in such information as device capability, availability, and location to determine an output. Edge level intelligence packages may be dynamically loaded onto the individual devices themselves, e.g., onto the robot 204. An example of an edge level intelligence package is a neural net model for visual analysis of the environment. When a robot is given a task to inspect a certain piece of industrial equipment for example, the system 300 may load a model to the robot, with the model trained to address the highly variable situations that may be present on that piece of equipment. When the environment changes, or a different environment is encountered, the system 300 may search for and deliver a different device intelligence package better suited to that environment.

As noted above, device intelligence packages may be configured for distribution between the edge of the deployment environment, the system 300, and other systems such as the data center 104 and enterprise services system 106. For instance, when the device intelligence package is light enough to be processed on a given device, the system 300 may deploy the entire package to the edge. Otherwise, the device may include a communication interface that communicates with the remote (e.g., cloud) portion of the intelligence package.

The system architecture shown in FIGS. 1 and 3 may be extended to include distributed knowledge bases. The knowledge bases may store and provide, e.g., formally represented task descriptions, environment maps, and both semantic and geometric object models. Devices may share information by uploading maps of environments the devices have explored or descriptions of tasks the devices have learned (e.g. articulation models). By selecting the information that is needed for the current task, devices may keep their local knowledge bases and object model databases small and efficient, while still have an access to a large pool of information in the background.

Each individual robot may be aware of the knowledge required to perform its actions. The system 300 may act as an orchestration layer with access to the global state of the environment, and may disseminate knowledge as necessary to the edge. That is, the system 300 may deploy selected knowledge to the selected devices in the appropriate situations. In the assembly line example of FIG. 2, for instance, assume that the environment must be able to dynamically handle multiple types of packages as they move through the assembly line 202. In this case, not every robot along the assembly line may have the capability to quickly identify and align the package. As such, at the beginning of the assembly line 202, there may be a device that identifies the package. Another device in the deployment environment may then sense the relative positioning and orientation of the package on the assembly line, and transmit the environmental characteristics to the system 300.

The system 300 may then maintain the environmental characteristics, and disseminate the appropriate knowledge to handle the package to each robot involved in the process. As another example, take the use case of a monitoring robot in the hospitality industry. If one robot notices a spill for example, another robot, with the capability to clean up that spill, needs to be deployed to the location. For this to happen, the system 300 may maintain a global state of the environment, including location of the spill. With this information concerning the change in the environment, the system 300 may deliver a specific device intelligence package to provide a device with the knowledge of how to respond to the spill, e.g., by cleaning it, issuing warnings, or refilling supply containers.

Expressed another way, for devices to carry out tasks, the system 300 provides precise action policies optimized based on the constraints of the environments. The system 300 may reference global maps of the environments to assess the constraints. As one example, assume a robot is in a room, and sensors in the environment update the global map of position of people in the room, including how crowded it is. The robot may then quickly pull that information and act accordingly, such as by switching to an operational mode, governed by a different device intelligence package, that implements more conservative movement in the crowded environment. As another example, assume the room contains three objects and the passive sensors in the environment track the object positions and update the map. Then, the robot need not carry out computationally intensive object searching, recognition, and matching algorithms each time the robot needs to carry out a task on the objects.

The maintenance of the state of the global map can be carried out by in several different ways. As one example, a device entering an environment links to the knowledge base and executes environment sensing with an object recognition module that identifies, matches, and compares the objects to the global knowledge base and update their states. As another example, sensors embedded in the environment may monitor any changes to the global map and object states, and provide updated state information responsive to the sensing. As a third example, the global map may be updated by any person or device, including a human passing through the environment. With an updated map, a device entering an environment may read the map to quickly assessed context and make decisions based on the context without the need to redo heavy computations.

The system 300 facilitates the transfer of skill sets obtained or learned by one device, to other devices in the deployment environment 200. As such, the other devices may benefit from the computations already performed for, e.g., optimizing the performance of the first device. The system 300 intelligently determines which device intelligence package to deliver and deploy to the device, responsive to the environment characteristics, the ontology model of the device, and the task to be performed. The system 300 facilitates deployment of computationally intensive tasks (e.g., machine learning or path optimization) to high performance resources as offloaded tasks, and communicates computation results as updated device intelligence policies to the device.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways.

Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

The invention claimed is:

1. A method comprising:
in a device control system in communication via a network with a plurality of devices in a deployment location:
implementing a data stream interface between the deployment location and the device control system;
receiving, through the data stream interface, a data stream comprising environmental characteristics of the deployment location;
accessing a device intelligence package library, the device intelligence package library comprising device intelligence packages, each of the device intelligence packages configured to govern operational characteristics of specific devices amongst the plurality of devices at the deployment location;
determining a selected device among the specific devices to control;
comparing the environmental characteristics to a device ontology model for the selected device and responsively identifying a selected first device intelligence package, in the device intelligence package library, with which to control the selected device;
offloading, by the device control system, a selected computation of the selected device intelligence package to an analytics system, the selected computation including a motion optimization computation, a machine learning task, or both;
receiving an analytics result for the selected computation from the analytics system;
responsive to the analytics result, controlling, by the device control system, a first aspect of the selected device by executing in the device control system a first portion of the selected first device intelligence package thereby generating control instructions data and transmitting the control instructions data to the selected device via the network;
communicating at least a second portion of the selected first device intelligence package to the selected device for execution by the selected device to control a second aspect of the selected device;
after controlling the selected device with the selected first device intelligence package, analyzing the data stream and determining a change in an operational environment and the environmental characteristics at the deployment location;
responsive to the change in the environmental characteristics, identifying a second device intelligence package in the device intelligence package library for controlling the selected device; and executing the identified second device intelligence package to control the selected device.

2. The method of claim 1, where:
the environmental characteristics comprise:
state information for the specific device.

3. The method of claim 1, where:
the environmental characteristics comprise:
state information for the deployment location.

4. The method of claim 1, where:
the selected intelligence package comprises a robot motion control package.

5. The method of claim 4, where:
the robot motion control package comprises a series of actions for the selected device to execute to complete a robot motion task.

6. The method of claim 1, wherein the first portion of the selected device intelligence package comprises a system level intelligence package comprising an orchestration algorithm, and wherein the second portion of the selected device intelligence package comprises an edge level intelligence package including a neural net model for visual analysis of the environment to be communicated to the selected device for execution by the selected device.

7. The method of claim 1, further comprising:
receiving, by the control system from the selected device, information regarding an object encountered by the selected device;
building a model of the object based on the information; and
associating the model with the object for use by a second selected device that encounters the object.

8. A system comprising:
a communication interface for access to a network between a deployment location and a device control system;
a memory configured to store a data stream received through the communication interface, the data stream comprising environmental characteristics of the deployment location;
a device intelligence package library storing device intelligence packages configured to govern operational characteristics of a selected device at the deployment location; and
control circuitry configured to:
after controlling a selected device with a first device intelligence package, analyze the data stream comprising the environmental characteristics of the deployment location;
determine a change in operating environment and the environmental characteristics at the deployment location responsive to the data stream;
compare the environmental characteristics to a device ontology model for the selected device and responsively identify a second device intelligence package for controlling the selected device given the change in operating environment and environmental characteristics at the deployment location;
offload, by the device control system, a selected computation of the selected device intelligence package to an analytics system, the selected computation including a motion optimization computation, a machine learning task, or both;
receive an analytics result for the selected computation from the analytics system;
responsive to the analytics result, control a first aspect of the selected device by executing in the device control system a first portion of the second device intelligence package thereby generating control instructions data and transmitting the control instructions data to the selected device through the communication interface via a network; and
deliver at least a second portion of the second device intelligence package to the selected device for execution by the selected device to control a second aspect of the selected device.

9. The system of claim 8, where:
the environmental characteristics comprise:
state information for the selected device.

10. The system of claim 8, where:
the environmental characteristics comprise:
state information for the deployment location.

11. The system of claim 8, where:
the intelligence package comprises a robot motion control package.

12. The system of claim 11, where:
the robot motion control package comprises a series of actions for the selected device to execute to complete a robot motion task.

13. The system of claim 8, wherein the first portion of the selected device intelligence package comprises a system level intelligence package comprising an orchestration algorithm, and wherein the second portion of the selected device intelligence package comprises an edge level intelligence package including a neural net model for visual analysis of the environment to be communicated to the selected device for execution by the selected device.

14. The system of claim 8, where the control circuitry is further configured to:
receive, by the control system from the selected device, information regarding an object encountered by the selected device;
build a model of the object based on the information; and
associate the model with the object for use by a second selected device that encounters the object.

15. A system comprising:
a communication interface configured to establish a data connection between:
a deployment location and a device control system; and
an analytics system and the device control system;
a memory configured to store device characteristics of a selected device at the deployment location received through the communication interface via a network;
a device intelligence package library storing device intelligence packages configured to determine operational characteristics of the selected device at the deployment location; and
control circuitry configured to:
execute in the device control system a selected first device intelligence package, available in the device intelligence package library, for determining the operational characteristics;
offload a selected computation of the selected first device intelligence package to the analytics system, the selected computation including a motion optimization computation, a machine learning task, or both;
receive an analytics result for the selected computation from the analytics system;
control the selected device with the selected first device intelligence package responsive to the analytics result by generating control instructions data in the device control system and transmitting the control instructions data to the selected device through the communication interface via the network;

analyze a data stream comprising environmental characteristics of the deployment location;
determine a change in the environmental characteristics at the deployment location responsive to the data stream;
identify a second device intelligence package in the device intelligence package library for controlling the selected device given the change in the environmental characteristics at the deployment location; and
execute the identified second device intelligence package for controlling the selected device.

16. The system of claim 15, where:
the device characteristics comprise:
state information for the selected device.

17. The system of claim 15, where:
the device characteristics comprise:
state information for the deployment location that was sensed by the selected device and received at the device control system through the communication interface.

18. The system of claim 15, where the control circuitry is configured to:
control a first aspect of the selected device by executing in the device control system a first portion of the first or second selected device intelligence package by generating control instructions data and transmitting the control instructions data to the selected device through the communication interface via the network; and
deliver at least a second portion of the first or second selected device intelligence package to the selected device for execution by the selected device to control a second aspect of the selected device.

19. The system of claim 18, wherein the first portion of the selected device intelligence package comprises a system level intelligence package comprising an orchestration algorithm, and wherein the second portion of the selected device intelligence package comprises an edge level intelligence package including a neural net model for visual analysis of the environment to be communicated to the selected device for execution by the selected device.

20. The system of claim 15, where the control circuitry is further configured to:
receive, by the control system from the selected device, information regarding an object encountered by the selected device;
build a model of the object based on the information; and
associate the model with the object for use by a second selected device that encounters the object.

* * * * *